United States Patent
Diehl

(10) Patent No.: US 9,858,633 B2
(45) Date of Patent: Jan. 2, 2018

(54) MODEL ANTI-COLLUSION WATERMARK

(71) Applicants: Sony Corporation, Tokyo (JP); Sony Pictures Entertainment Inc., Culver City, CA (US)

(72) Inventor: Eric Diehl, Burbank, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 48 days.

(21) Appl. No.: 15/003,690

(22) Filed: Jan. 21, 2016

(65) Prior Publication Data

US 2016/0217545 A1 Jul. 28, 2016

Related U.S. Application Data

(60) Provisional application No. 62/107,230, filed on Jan. 23, 2015.

(51) Int. Cl.
  *G06K 9/00* (2006.01)
  *G06T 1/00* (2006.01)
  *H04L 9/32* (2006.01)

(52) U.S. Cl.
  CPC ............ *G06T 1/0021* (2013.01); *G06T 1/005* (2013.01); *H04L 9/32* (2013.01); *G06T 2201/0063* (2013.01)

(58) Field of Classification Search
  CPC . H04N 21/8358; G10L 19/018; G06T 1/0028; G06T 1/005; G06T 1/0021
  USPC ........ 382/100, 210, 232, 250, 251; 713/176, 713/187, 193, 194; 380/205, 210, 28, 29, 380/37; 704/273, 272, 500, 501, 503; 705/57; 726/26, 27
  See application file for complete search history.

(56) References Cited

U.S. PATENT DOCUMENTS

| | | | | |
|---|---|---|---|---|
| 6,700,991 B1 * | 3/2004 | Wu | ........................ | G06T 1/0071 382/100 |
| 6,954,857 B2 * | 10/2005 | Pelly | ...................... | G06T 1/0078 382/100 |
| 7,447,912 B2 * | 11/2008 | Jakubowski | ............ | G06F 21/14 713/187 |
| 8,051,290 B2 * | 11/2011 | Oostveen | ............... | G06T 1/0028 382/100 |
| 8,144,923 B2 * | 3/2012 | Zhao | ...................... | G06T 1/0035 382/100 |
| 8,379,841 B2 * | 2/2013 | Taylor | ................... | H04L 9/0662 380/28 |
| 8,811,655 B2 | 8/2014 | Petrovic et al. | | |
| 2002/0114459 A1 | 8/2002 | Belenko et al. | | |

(Continued)

OTHER PUBLICATIONS

International Search Report and Written Opinion of the International Search Authority for International Application No. PCT/US2016/014595 dated Mar. 30, 2016 in 9 pages.

*Primary Examiner* — Charlotte M Baker
(74) *Attorney, Agent, or Firm* — Procopio, Cory, Hargreaves & Savitch LLP

(57) ABSTRACT

Embedding a watermark payload in content, including: a counter configured to store a random seed; a permutation generator configured to receive and process the watermark payload and the random seed, and generate a shuffled payload based on the random seed; and a watermark embedder configured to receive and embed the shuffled payload into the content. Key words include watermark payload and collusion.

18 Claims, 5 Drawing Sheets

(56) References Cited

U.S. PATENT DOCUMENTS

2012/0163583 A1 6/2012 Nakagata et al.
2013/0011006 A1 1/2013 Petrovic et al.
2013/0148843 A1 6/2013 Doerr et al.

* cited by examiner

| Identifier | No. of bits |
|---|---|
| MODEL NO. 310 | 16 |
| INDIVIDUAL ID 320 | 24 |
| RAND_PAD 330 | 20 |
| ERROR CORRECTION CODE 330 | 4 |

MODEL ANTI-COLLUSION WATERMARK

CROSS-REFERENCE TO RELATED APPLICATIONS

This application claims the benefit of priority under 35 U.S.C. §119(e) of U.S. Provisional Patent Application No. 62/107,230, filed Jan. 23, 2015, entitled "Model Anti-Collusion Watermark." The disclosure of the above-referenced application is incorporated herein by reference.

BACKGROUND

Field of the Invention

The present disclosure relates to digital watermarking, and more specifically, to anti-collusion watermarking.

Background

The purpose of forensics marking is to facilitate the identification of leaking audio-visual sources. As such, the forensic marking may complement other investigation tools. The aim is to discover the compromised device or the set of compromised devices, or the infringing viewer.

One known attack is called collusion. Two or more, colluding principals mix in some way their individually watermarked pieces of content with the hope that the attack either erases the embedded information or points to another principal.

One commonly proposed solution is to use payloads supporting anti-collusion. They are often referred to as Tardos codes and many researchers followed the principles of Tardos codes. Tardos codes allow detection with high probability of the collusion of two or more colluders.

The main problem with Tardos codes is that they require a payload length of several hundreds or thousands of bits. Long payloads may be only practical with usual digital watermarking strategies using the full length of the piece of content to embed many successive occurrences of the payload. Unfortunately, it may not be true for sequence key-like watermarking strategies, which typically do not support long payloads.

SUMMARY

The present disclosure provides for anti-collusion and traitor tracing by shuffling watermark payload in content.

In one implementation, a system for embedding a watermark payload in content is disclosed. The system includes: a counter configured to store a random seed; a permutation generator configured to receive and process the watermark payload and the random seed, and generate a shuffled payload based on the random seed; and a watermark embedder configured to receive and embed the shuffled payload into the content.

In another implementation, method to embed a watermark payload in content is disclosed. The method includes: generating a random seed using a counter; shuffling the watermark payload to generate a shuffled payload based on the random seed; and embedding the shuffled payload into the content.

In another implementation, a method to detect a group of traitors colluding to obtain content is disclosed. The method includes: extracting a watermark payload from the content; unshuffling the watermark payload using a reverse permutation generator and an expected output of a counter to generate an unshuffled payload; and applying a majority decision on a set of unshuffled watermark payloads to detect the group of traitors.

In yet another implementation, an apparatus is disclosed. The apparatus includes: a processor; and memory connected to the processor, the memory storing a computer program to embed a watermark payload in content, the computer program comprising instructions executable by the processor that cause the apparatus to: generate a random seed using a counter; shuffle the watermark payload to generate a shuffled payload based on the random seed; and embed the shuffled payload into the content.

In a further implementation, an apparatus is disclosed. The apparatus includes: a processor; and memory connected to the processor, the memory storing a computer program to detect a group of traitors colluding to obtain content, the computer program comprising instructions executable by the processor that cause the apparatus to: extract a watermark payload from the content; unshuffle the watermark payload using a reverse permutation generator and an expected output of a counter to generate an unshuffled payload; and apply a majority decision on a set of unshuffled watermark payloads to detect the group of traitors.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which:

FIG. 3 shows an exemplary layout of a payload in a table format in accordance with one implementation of the present disclosure.

DETAILED DESCRIPTION

Figure 1A:
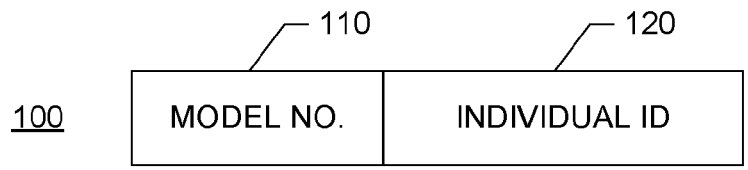
FIG. 1A is an exemplary watermark payload for each principal in accordance with one implementation of the present disclosure.

As stated above, forensics marking facilitates the identification of a compromised device or set of compromised devices. However, principals can collude to either erase the embedded/watermarked information of content or point to another principal. Anti-collusion schemes such as Tardos codes allow detection of two or more colluders. As noted above, the main problem with Tardos codes is that they require a payload length of several hundreds or thousands of bits, which may not be suitable for sequence key-like watermarking strategies.

Certain implementations as disclosed herein teach techniques for an anti-collusion/traitor tracing system using a robust anti-collusion method. In one implementation, a group of potentially colluding principals is identified by the common model number in the payload of the content. In a further implementation, the positions of individual bits of the payload are permutated. After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

In one implementation of the anti-collusion system, rather than identifying the individual colluding principal, the system attempts to identify a group of potentially colluding principals. Each principal is classified within a group of principals that is more likely to collude together, for instance, using the same model of device to capture content. In some implementations, the anti-collusion system may include two parts, a watermark embedding system and a traitor detection system.

In one implementation, playback devices perform the embedding of the payload. Thus, the objective of the anti-collusion system is to identify the manufacturer and model of device that a collusion attack used. The likelihood that colluders will use the same model is high.

FIG. 1A is an exemplary watermark payload 100 for each principal in accordance with one implementation of the present disclosure. The payload 100 includes two fields, which are the model number 110 (which may identify both the manufacturer and the model of the device) and the individual device identifier (individual ID) 120. In the illustrated exemplary watermark payload 100 of FIG. 1A, the model number 110 is a number of the model of the devices belonging to the principals. That is, the model number 110 uniquely identifies the group of principals. This assumes that all members of this group share the same model number 110. Thus, the individual ID 120 uniquely identifies the principal within its group.

When extracting the watermark payloads from a potentially marked piece of content, there are two potential scenarios. One scenario is a case (Case 1) in which the attacker did not collude. In Case 1, the extracted payload 100 is genuine and identifies the leaking principal using the model number 110 and the individual ID 120. Another scenario is a case (Case 2) in which the attackers of the same group colluded. Thus, the attackers may access several differently watermarked instances of the same piece of content. In Case 2, the attackers can mount a collusion attack. However, the resultant payload of the collusion attack has an invariant in the model number, therefore, identifying the leaking model.

Figure 1B:
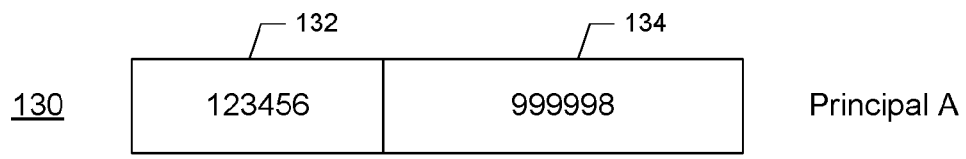
FIG. 1B shows an exemplary anti-collusion method to identify the group of colluding principals in accordance with one implementation of the present disclosure.
Figure 1B:
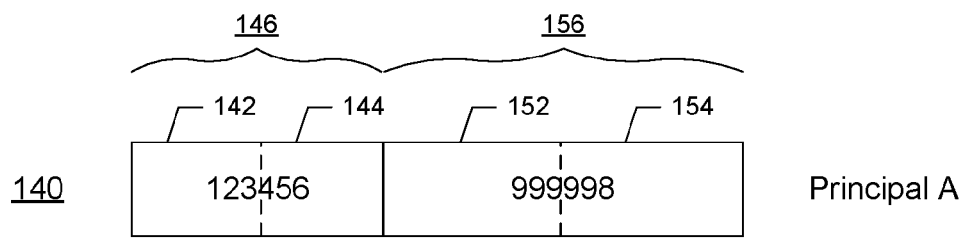
Figure 1B:
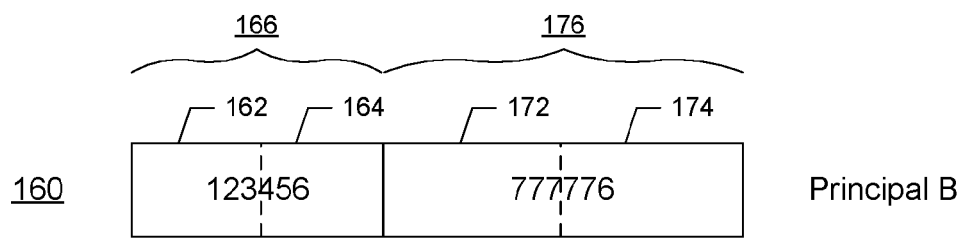
Figure 1B:
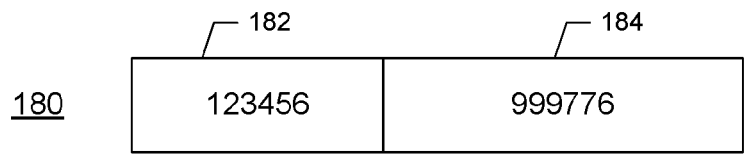
Figure 1B:
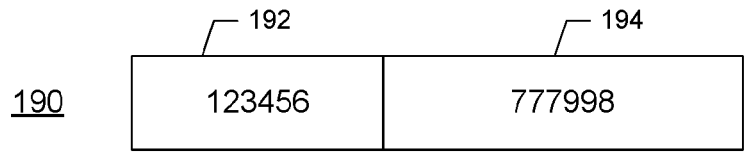

FIG. 1B shows an exemplary anti-collusion method to identify the group of colluding principals in accordance with one implementation of the present disclosure. In the illustrated implementation of FIG. 1B, payload 130 shows one example of Case 1 in which the attacker did not collude. Thus, using payload 130, the principal with individual ID '999998' and model ID '123456' is identified as an attacker.

The illustrated implementation of FIG. 1B also includes examples of Case 2 involving payloads 140, 160, 180, 190. For example, payload 140 can be represented as a payload of principal A, while payload 160 can be represented as a payload of principal B. Payload 140 includes the model number 146 ('123456') and the individual ID 156 ('999998'). Payload 160 includes the model number 166 ('123456') and the individual ID 176 ('777776'). Since the two payloads 140, 160 have the same model number 146, 166, the two principals, Principals A and B, are considered to be in a same group of principals (e.g., Group X). Further, Group X may include principals other than Principals A and B (e.g., Principals C, D, E, and so on).

In the exemplary implementation of FIG. 1B, it is assumed that Principals A and B have colluded by breaking up the contents owned by Principals A and B including the payloads 140, 160 and piecing together different parts of the contents. For example, in FIG. 1B, payload 140 is broken up into four pieces 142, 144, 152, 154. That is, the model number 146 is broken into pieces 142, 144, while the individual ID 156 is broken into pieces 152, 154. The same process is used to break up payload 160 into four pieces 162, 164, 172, 174. That is, the model number 166 is broken into pieces 162, 164, while the individual ID 176 is broken into pieces 172, 174.

Principals A and B then selectively combines four pieces 142, 144, 152, 154 of payload 140 with four pieces 162, 164, 172, 174 of payload 160 to produce a different payload (e.g., payload 180 or 190). Since the payloads are embedded in the content, the selection must include four pieces sequentially selected from the eight pieces in payloads 140, 160. That is, four selections are made, wherein one selection is made from each of 142/162, 144/164, 152/172, 154/174.

In one example shown in payload 180, following selections are made 142, 164, 152, 174 to produce model number 182 of '123456' and individual ID 184 of '999776'. Thus, model number 182 of '123456' is a combination of piece 142 of '123' and piece 164 of '456', while individual ID 184 of '999776' is a combination of piece 152 of '999' and piece 174 of '776'. Therefore, in this example, although individual ID 184 of '999776' does not provide accurate information about the colluding principals (i.e., Principals A and B with IDs of '999998' and '777776'), model number 182 of '123456' provides accurate information about the model number of the colluding principals.

In another example shown in payload 190, following selections are made 162, 144, 172, 154 to produce model number 192 of '123456' and individual ID 194 of '777998'. Thus, model number 192 of '123456' is a combination of piece 162 of '123' and piece 144 of '456', while individual ID 194 of '777998' is a combination of piece 172 of '777' and piece 154 of '998'. Again, in this example, although individual ID 194 of '777998' does not provide accurate information about the colluding principals (i.e., Principals A and B with IDs of '999998' and '777776'), model number 192 of '123456' provides accurate information about the model number of the colluding principals.

As can be seen from the above two examples, since the payload has an invariant value in the model number, it may become an easy target for the colluding principals. Thus, in a further implementation, the position of individual bits of the payload for each repetition of the payload within the watermarked content is permutated.

Figure 2A:
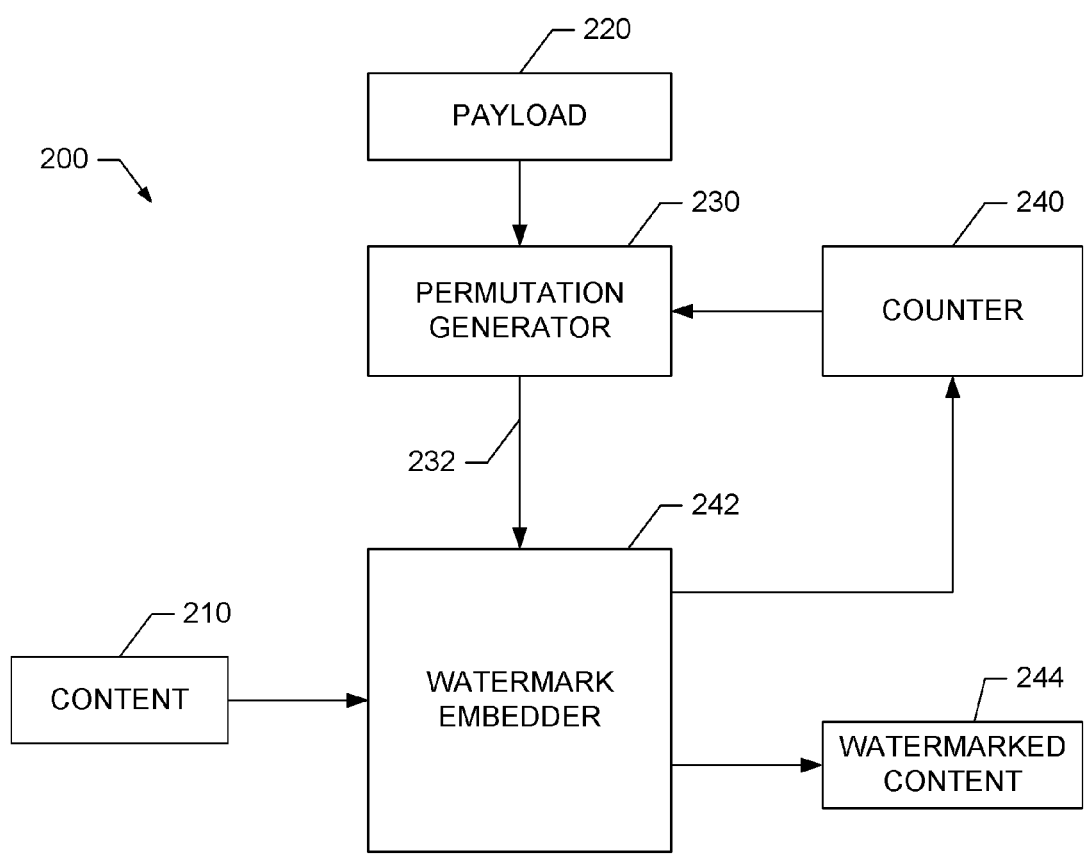
FIG. 2A is a functional block diagram of a watermark embedding system in accordance with one implementation of the present disclosure.

FIG. 2A is a functional block diagram of a watermark embedding system 200 in accordance with one implementation of the present disclosure. In the illustrated implementation of FIG. 2A, the watermark embedding system 200 includes a counter 240, a pseudo-random permutation generator 230, and a watermark embedder 242. The pseudo-random permutation generator 230 may differ from a true random permutation generator in that the technique of the pseudo-random permutation generator 230 is designed to be sufficiently complicated so that its output appears to be random to someone who does not know the technique, and can pass various statistical tests of randomness. Thus, the output of the pseudo-random permutation generator 230 may not be random, but deterministic. In other implementation, the permutation generator 230 may use some other deterministic method to generate a shuffled value. The counter 240 holds the current random seed such that the pseudo-random permutation generator 230 receives the output of the counter 240, calculates the pseudo-random permutation, and the counter 240 is appropriately updated by the system 200.

In FIG. 2A, the payload 220 (e.g., equivalent to payload 100, 130, 140, or 160) and the output of the counter 240 are fed into the pseudo-random permutation generator 230. The output of the pseudo-random permutation generator 230 is a shuffled payload 232. All the bits of payload 220 are present in the shuffled payload 232 but in a random order. The watermark embedder 242 receives the content 210 and embeds one full shuffled payload 232. The outcome is the watermarked content 244. After each complete payload embedding, the watermark embedder 242 (e.g., an interface unit in the watermark embedder 242) requests the counter 240 to increment its value. This increment in the counter 240 generates a new value of the shuffled payload 232. The initial value (or random seed) of the counter 240 may depend on the content 210. In one exemplary implementation, the watermark embedder 242 includes a content evaluator (not shown) that evaluates certain predetermined properties (e.g., resolution, metadata, type, etc.) of the content to generate the initial value of the counter 240. In another implementation, the initial value is carried within the metadata of the piece of content or determined by some parameters of the piece of content itself. For example, it may be the result of the hash of the n first video segments.

As mentioned above, once the shuffled payload 232 is embedded into the content 210 using the watermark embedder 242, the watermarked content 242 is presented to the principal using a playback device. In one implementation, the playback device is the same device as the device that performed the embedding of the watermarked content 242. In another implementation, the playback device is a connected remote device that is different from the device that performed the embedding of the watermarked content 242.

In another implementation, the output of the watermark embedding system 200 (i.e., the watermarked content 244) is received by a traitor detection system to detect the model number of the device used by a group of colluding principals. For example, for each shuffled payload 232 successfully extracted by the traitor detection system, the expected payload 220 is retrieved using the reverse pseudo-random permutation generator.

The pseudo-random permutation generator 230 may use a technique such as used with the Yates-Fisher technique with a possible variant. The pseudo-random permutation generator 230 uses a seed that is defined by a combination counter 240 and the order in the sequence, for example, a Secure Hash Algorithm 1 (SHA-1) (counter+i) modulo i. The watermark embedder 242 is a typical sequence key-like embedder that selects the '0' or '1' watermarked video segment depending on the corresponding value of the shuffled payload 232.

Figure 2B:
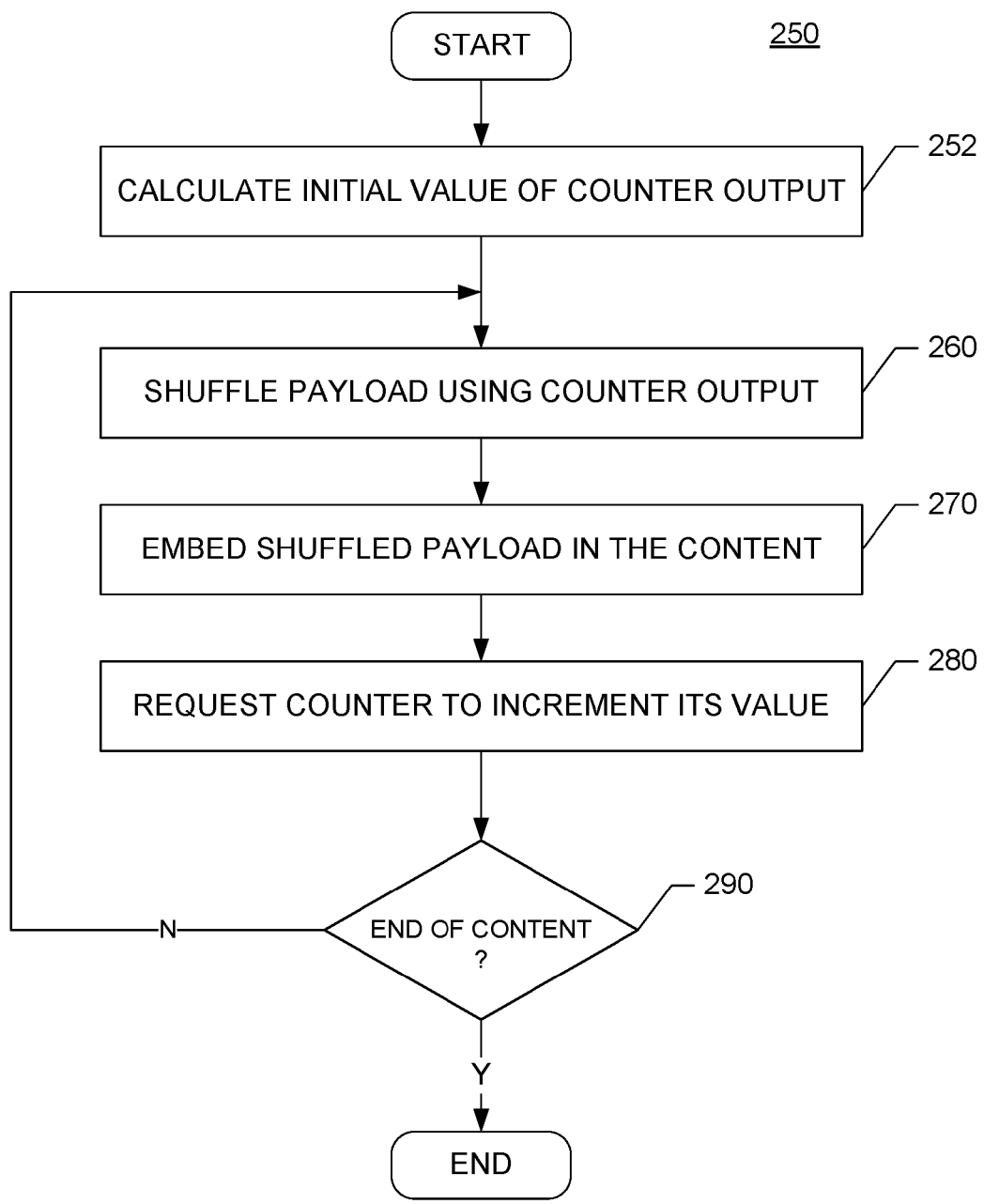
FIG. 2B is a flow diagram illustrating a process for watermark embedding in accordance with one implementation of the present disclosure.

FIG. 2B is a flow diagram illustrating a process for watermark embedding 250 in accordance with one implementation of the present disclosure. In the illustrated implementation of FIG. 2B, the initial value of the output of the counter is calculated, at block 252. The payload 220 (e.g., equivalent to payload 100, 130, 140, or 160) is then shuffled using the output of the counter, at block 260, to produce a shuffled payload. All the bits of the payload 220 are present in the shuffled payload but in a random order. One shuffled payload is embedded into the content, at block 270. After each complete payload embedding, the watermark embedding process 250 requests the counter to increment its value, at block 280. This increment in the counter generates a new value of the shuffled payload 232. If the end of the content is reached, at block 290, the process 250 is terminated. Otherwise, the process 250 reverts back to block 260 to shuffle more payloads.

FIG. 3 shows an exemplary layout of a payload 300 in a table format in accordance with one implementation of the present disclosure. In the exemplary implementation of FIG. 3, the payload 300 includes 64 bits. The first w bits (e.g., 16 bits) include a model number 310, which uniquely identifies a manufacturer and one of its technical model. The next x bits (e.g., 24 bits) include an individual ID 320, which uniquely identifies a device within a given model. The next y bits (e.g., 20 bits) include a 'Rand_pad' identifier 330, which specifies a random number unique to the title. The value is not secret and is generated during authoring. The next z bits (e.g., 4 bits) include an Error Correcting Code (ECC) 340, which is used to correct any errors occurring in extracting of the payload of the three previous fields 310, 320, 330. The ECC 340 is calculated during the generation of the segment keys.

Figure 4:
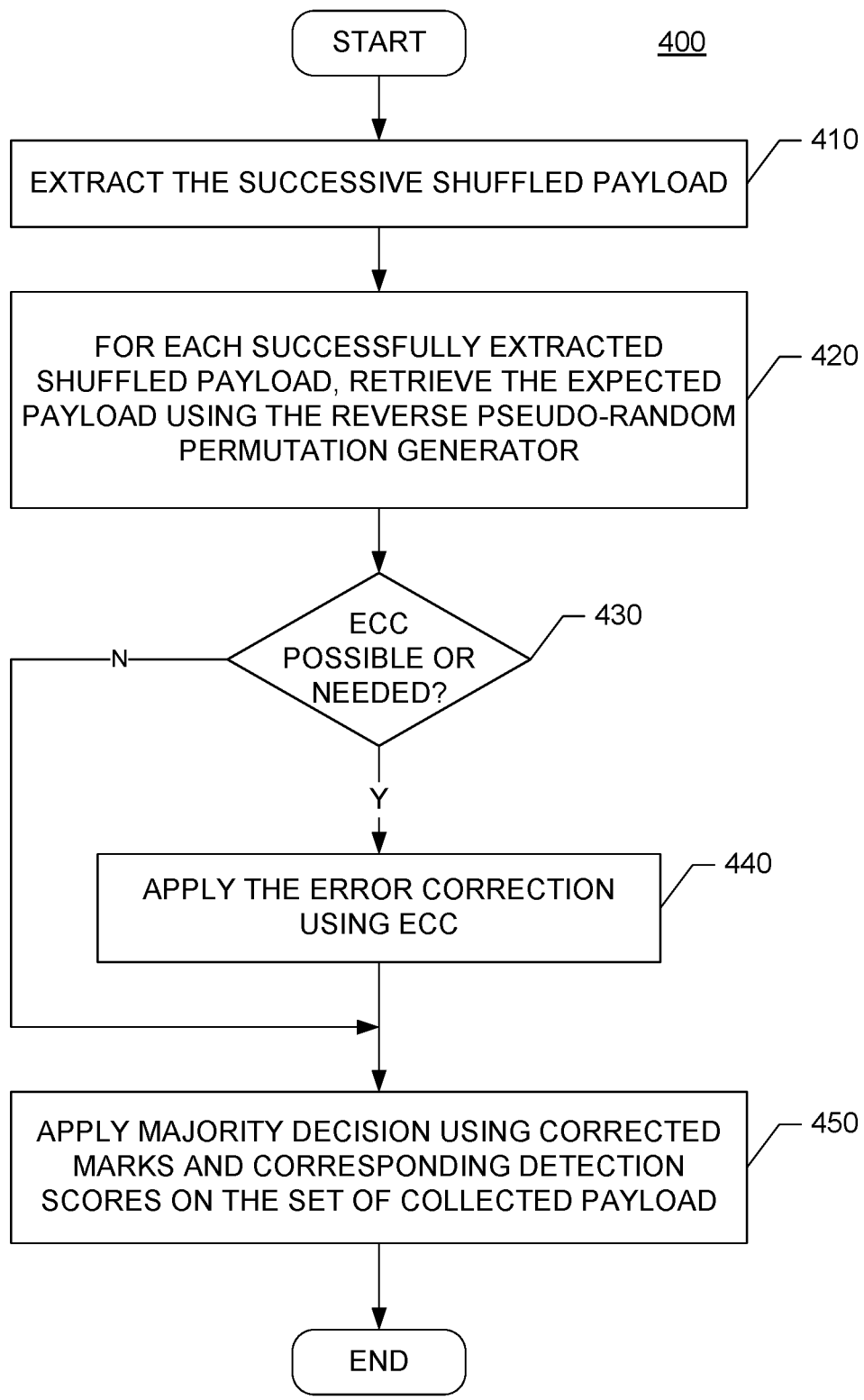
FIG. 4 is a flow diagram illustrating a process for traitor detection in accordance with one implementation of the present disclosure.

FIG. 4 is a flow diagram illustrating a process for traitor detection 400 in accordance with one implementation of the present disclosure. The traitor detection process 400 includes extracting the successive shuffled payload 232, at block 410. As mentioned above with the description of FIG. 2B, successive shuffled payloads are embedded into a piece of content several times, wherein the shuffled payload is different each time as the counter is incremented. For each successfully extracted shuffled payload 232, the expected payload 220 is retrieved, at block 420, using the reverse pseudo-random permutation generator. The retrieval of the expected payload 220 "unshuffles" the shuffled payload 232. The expected payload retrieval step 420 also uses the expected value of the counter.

A determination is made, at block 430, whether the error correction is possible or needed. If it is determined, at block 430, that the error correction is possible or needed, the error correction is applied, at block 440, using the error correction code (ECC) (e.g., ECC 330 in FIG. 3). A majority decision is then applied, at block 450, using the corrected marks and the corresponding detection scores on a set of collected payloads.

In one implementation, a simple majority decision counts the number of times a bit was detected as '0' and the number of times it was detected as '1'. The value of the bit is determined to be the value with the most count. A more sophisticated majority decision may weigh the value of each extracted bit with a detection score.

One implementation includes one or more programmable processors and corresponding computer system components to store and execute computer instructions. Combinations of hardware, software, and firmware can also be used. For example, in the provider system, distribution, and playback, the encryption of data, building and distribution of content files, conversion, and generating checksums can be performed by one or more computer systems executing appropriate computer instructions on one or more processors utilizing appropriate components and systems (such as memory, computational units, buses, etc.).

The above description of the disclosed implementations is provided to enable any person skilled in the art to make or use the disclosure. Various modifications to these implementations will be readily apparent to those skilled in the art, and the generic principles described herein can be applied to other embodiments without departing from the spirit or scope of the disclosure. Accordingly, the techniques are not limited to the specific examples described above. Thus, it is to be understood that the description and drawings presented herein represent a presently preferred embodiment of the disclosure and are therefore representative of the subject matter that is broadly contemplated by the present disclosure. It is further understood that the scope of the present disclosure fully encompasses other embodiments that may become obvious to those skilled in the art and that the scope of the present disclosure is accordingly limited by nothing other than the appended claims.

The invention claimed is:

1. A system for embedding an anti-collusion watermark payload in content, the system comprising:
   a memory configured to store a random seed;
   a processor including:
   a permutation generator configured to
      receive and process a watermark payload and the random seed, and
      generate a shuffled payload based on the random seed; and
   a watermark embedder configured to receive and embed the shuffled payload into the content,
   wherein the watermark payload is shuffled to enable identification of a common model number of machines used in collusion.

2. The system of claim 1, wherein the watermark embedder comprises
   an evaluator configured to evaluate predetermined properties of the content to set the random seed.

3. The system of claim 1, wherein the watermark embedder comprises
   an interface unit configured to increment the random seed after the shuffled payload is embedded into the content.

4. The system of claim 1, wherein the permutation generator is a pseudo-random permutation generator.

5. The system of claim 1, wherein the system is a playback device configured to playback the content.

6. The system of claim 1, wherein the watermark payload comprises a model number and an individual device identifier.

7. A method to embed an anti-collusion watermark payload in content, the method comprising:
   generating a random seed using a counter;
   shuffling the watermark payload to generate a shuffled payload based on the random seed,
   wherein the watermark payload is shuffled to enable identification of a common model number of machines used in collusion; and
   embedding the shuffled payload into the content.

8. The method of claim 7, wherein shuffling the watermark payload comprises
   randomly rearranging a bit order of the watermark payload using the random seed.

9. The method of claim 7, further comprising
   requesting the counter to increment the random seed after the shuffled payload is embedded into the content.

10. The method of claim 7, further comprising
    evaluating predetermined properties of the content to set the random seed.

11. A method to detect a group of traitors colluding to obtain content, the method comprising:
    extracting a shuffled watermark payload from the content, wherein the watermark payload is shuffled to enable identification of a common model number of machines used in the collusion by the group of traitors;
    unshuffling the watermark payload using a reverse permutation generator and an expected output of a counter to generate an unshuffled payload; and
    applying a majority decision on a set of unshuffled watermark payloads to detect the group of traitors.

12. The method of claim 11, wherein the majority decision uses detection scores corresponding to the set of unshuffled watermark payloads.

13. The method of claim 11, wherein the unshuffled watermark payload comprises
    a model number and an individual device identifier.

14. The method of claim 11, wherein the unshuffled watermark payload comprises an error correction code.

15. An apparatus comprising:
    a processor; and
    memory connected to the processor, the memory storing a computer program to embed a watermark payload in content, the computer program comprising instructions executable by the processor that cause the apparatus to:
    generate a random seed using a counter;
    shuffle the watermark payload to generate a shuffled payload based on the random seed,
    wherein the watermark payload is shuffled to enable identification of a common model number of machines used in collusion; and
    embed the shuffled payload into the content.

16. The apparatus of claim 15, wherein the apparatus is a playback device configured to playback the content.

17. An apparatus comprising:
    a processor; and
    memory connected to the processor, the memory storing a computer program to detect a group of traitors colluding to obtain content, the computer program comprising instructions executable by the processor that cause the apparatus to:
    extract a shuffled watermark payload from the content, wherein the watermark payload is shuffled to enable identification of a common model number of machines used in collusion;
    unshuffle the watermark payload using a reverse permutation generator and an expected output of a counter to generate an unshuffled payload; and
    apply a majority decision on a set of unshuffled watermark payloads to detect the group of traitors.

18. The apparatus of claim 17, wherein the majority decision uses detection scores corresponding to the set of unshuffled watermark payloads.

* * * * *